(12) United States Patent
von Aswege

(10) Patent No.: US 11,994,104 B2
(45) Date of Patent: May 28, 2024

(54) INDIVIDUAL BLADE ADJUSTMENT IN A WIND POWER INSTALLATION

(71) Applicant: Wobben Properties GmbH, Aurich (DE)

(72) Inventor: Enno von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/172,764

(22) Filed: Feb. 22, 2023

(65) Prior Publication Data

US 2023/0265831 A1 Aug. 24, 2023

(30) Foreign Application Priority Data

Feb. 23, 2022 (EP) ..................................... 22158337

(51) Int. Cl.
*F03D 7/02* (2006.01)
*F03D 7/04* (2006.01)

(52) U.S. Cl.
CPC ........... *F03D 7/024* (2013.01); *F03D 7/0224* (2013.01); *F03D 7/044* (2013.01);
(Continued)

(58) Field of Classification Search
CPC ........ F03D 7/024; F03D 7/0224; F03D 7/044; F05B 2240/221; F05B 2260/74
See application file for complete search history.

(56) References Cited

U.S. PATENT DOCUMENTS

| 4,160,170 A | * | 7/1979 | Harner | .................. F03D 7/0224 |
| | | | | 416/37 |
| 8,174,136 B2 | * | 5/2012 | Johnson | .................. F03D 7/028 |
| | | | | 290/44 |

(Continued)

FOREIGN PATENT DOCUMENTS

WO 2015/192852 A1 12/2015
WO 2020/104664 A1 5/2020

*Primary Examiner* — David E Sosnowski
*Assistant Examiner* — Aye S Htay
(74) *Attorney, Agent, or Firm* — Seed IP Law Group LLP

(57) ABSTRACT

A method for controlling a wind power installation, wherein the wind power installation has a rotor with a plurality of rotor blades, the rotor blades are adjustable in their blade angle, each rotor blade is activatable individually, for the individual activation, in each case a total adjustment rate $R_{of}$ which indicates an intended speed of change of the respective blade angle is predetermined, a collective blade angle identical for all of the rotor blades is provided, a collective adjustment rate identical for all of the rotor blades describes an intended speed of change of the collective blade angle, an individual offset angle which indicates a value by which the blade angle is intended to deviate from the collective blade angle is predetermined for each rotor blade, an individual feed forward control adjustment rate which indicates an adjustment rate which is provided for reaching the offset angle is determined for each rotor blade from the individual offset angle, an individual offset deviation is determined for each rotor blade depending on a comparison of the individual offset angle and a detected blade angle of the rotor blade, and the total adjustment rate of each rotor blade is determined depending on the collective blade angle and/or the collective adjustment rate, the individual feed forward control adjustment rate, and the individual offset deviation.

16 Claims, 4 Drawing Sheets

(52) U.S. Cl.
CPC ....... *F05B 2200/11* (2013.01); *F05B 2200/13* (2013.01); *F05B 2200/261* (2013.01); *F05B 2200/262* (2013.01); *F05B 2220/706* (2013.01); *F05B 2240/221* (2013.01); *F05B 2260/74* (2013.01); *F05B 2270/706* (2013.01)

(56) References Cited

U.S. PATENT DOCUMENTS

| | | | |
|---|---|---|---|
| 2011/0115224 A1* | 5/2011 | Lausen | F03D 7/024 |
| | | | 290/44 |
| 2011/0229300 A1* | 9/2011 | Kanev | F03D 7/043 |
| | | | 415/33 |
| 2016/0377058 A1* | 12/2016 | Caponetti | F03D 7/0224 |
| | | | 416/1 |
| 2020/0088165 A1* | 3/2020 | Nielsen | F03D 7/0224 |
| 2021/0115897 A1* | 4/2021 | Landa | F03D 7/0224 |
| 2021/0164441 A1* | 6/2021 | Caponetti | F03D 7/0224 |
| 2022/0010772 A1 | 1/2022 | Von Aswege | |

\* cited by examiner

INDIVIDUAL BLADE ADJUSTMENT IN A WIND POWER INSTALLATION

BACKGROUND

Technical Field

The present invention relates to a method for controlling a wind power installation, and the invention also relates to a corresponding wind power installation. In particular, the invention relates to carrying out individual adjustment of rotor blades of a rotor of the wind power installation, which adjustment may also be referred to as individual blade adjustment.

Description of the Related Art

Wind power installations are known; they convert kinetic energy from wind by means of a rotor with a plurality of rotor blades into mechanical work and further into electrical energy by means of a generator. The present disclosure relates at any rate to wind power installations operating in accordance with this principle.

Modern wind power installations nowadays have a rotor diameter of more than 100 meters. The rotor blades therefore sweep over a circular area having a diameter of such a size. Three rotor blades are conventionally provided which are correspondingly uniformly offset from one another by 120° in the rotor and are therefore in each case in different regions of the rotor surface at a specific time. As a result, the rotor blades may be exposed to different wind conditions at the same time. In particular, the wind speed and also the wind direction may be different.

In particular, these different wind conditions may be perceptible as different blade loads. In order to take these into consideration, it is possible to provide an individual blade adjustment which adapts the blade angle of the respective rotor blade to the specific loading of the blade.

Such loadings frequently occur cyclically during rotation, and therefore a cyclic adjustment of the blade during rotation may be expedient. In simplified and illustrative terms, the blade loading may be greater in an upper region of the rotor surface than in a lower region, and provision may correspondingly be made to rotate the rotor blade somewhat out of the wind in the upper region of the rotor surface and to rotate it somewhat into the wind at the lower region of the rotor surface. A sinusoidal function can be provided for this purpose.

To control the wind power installation overall, a suitable working point which comprises a collective blade angle also has to be set. Such a collective blade angle may also be referred to synonymously as collective pitch angle. Overall, a blade angle may also be synonymously referred to as pitch angle.

Such a collective blade angle is identical for all of the rotor blades and an individual offset angle is then individually combined with or connected to it for each rotor blade.

In one case, this can mean that an individual sinusoidal offset angle is combined with the collective blade angle. Such a sinusoidal offset angle could basically also be identical for all of the rotor blades, depending on amplitude and frequency, but with a phase displacement. It could also have different amplitudes between the individual rotor blades whereas the frequency is intended to be identical for all of the rotor blades.

In one specific implementation, the actual blade angle may not precisely correspond to the predetermined and/or assumed blade angle. Such deviations are conventionally individual, i.e., have to be noted individually for each blade. In order to take into consideration such a deviation, a feedback controller can be provided which adjusts a deviation between detected blade angle and intended blade angle. In order to come close to virtually stationary accuracy, an integral response can be provided here.

It should be taken into consideration here that modern wind power installations have rotor blades of such a size that the dynamics thereof should be taken into consideration during the adjustment of their rotor blade. In other words, during the adjustment of the blades, said rotor blades are rotated about their own longitudinal axis and said rotation cannot take place either as rapidly as desired or as suddenly as desired since such rotor blades, in addition to their great length, also have a considerable depth of some meters, at least in the vicinity of the rotor hub. It is therefore frequently advantageous to already use the master controller to determine blade angle adjustment rates instead of absolute values for the adjustment of the blade angles.

In the case of the described individual blade adjustment, this means that an adjustment rate for taking into consideration the individual offset blade angle should be provided in addition to an adjustment rate for setting the collective blade angle.

All in all, there can therefore be a complex system in which a collective blade angle has to be predetermined and taken into consideration, an individual blade angle has to be predetermined and taken into consideration for each rotor blade, diverse properties of the rotor, rotor blade and adjustment device have to be taken into consideration, and in particular dynamics or at least a moment of inertia of the respective rotor blade, and also angular deviations are intended to be taken into consideration as readily as possible.

BRIEF SUMMARY

Provided are wind turbines and methods for individual blade adjustment.

Provided is a method for controlling a wind power installation. The wind power installation is based on an installation having a rotor with a plurality of rotor blades, in particular with three rotor blades. The rotor blades are adjustable in their blade angle, and each rotor blade is activatable individually and therefore also adjustable individually, namely in its blade angle. For individual activation, a total adjustment rate which indicates an intended speed of change of the respective blade angle is in each case predetermined. The adjustment rate therefore describes a change in the blade angle per period of time.

Furthermore, a collective blade angle identical for all of the rotor blades is provided. Such a collective blade angle can also be referred to synonymously as collective pitch angle or as common blade angle. The collective blade angle is therefore a blade angle which basically does not take into consideration individual differences between the individual rotor blades. It particularly determines the current working point. The collective blade angle can have a fixed value, for example, in the partial load range, when the wind speed is still below a nominal wind speed. However, the collective blade angle can also be changeable in the partial load range if the corresponding regulation concept provides this. In particular, the collective blade angle is changeable outside the partial load range, i.e., in particular in a full load range or in a transition range from partial load range to full load range. If the collective blade angle is changeable, this changeability is therefore also identical for all of the rotor blades. The manner of taking this into consideration will also be described below.

In addition, a collective adjustment rate which is identical for all of the rotor blades, and which describes an intended speed of change of the collective blade angle is provided. Accordingly, the collective adjustment rate can also be referred to synonymously as common adjustment rate. The collective adjustment rate is therefore closely associated with the collective blade angle. It can be taken into consideration directly or via the collective blade angle. Similarly, the collective blade angle can be taken into consideration directly or by taking the collective adjustment rate into consideration.

Furthermore, an individual offset angle which indicates a value by which the blade angle is intended to deviate from the collective blade angle is predetermined for each rotor blade. Via the collective blade angle or the collective adjustment rate, an identical value is therefore provided for all of the rotor blades. Individual differences can be taken into consideration for each rotor blade via the respective individual offset angles.

For example, each individual offset angle can be continuously recalculated and/or predetermined by a cyclic function, in particular cyclic functions with the same frequency during rotation. The frequency can correspond to a rotation frequency of the rotor. For example, an individual offset angle can be predetermined for each rotor blade by a sine function. Other functions, however, are also suitable, for example a triangular function. However, the sine function is preferred.

Furthermore, provision is made that an individual feed forward control adjustment rate which indicates an adjustment rate which is provided for reaching the offset angle is determined from the individual offset angle for each rotor blade. To this extent, provision is made to determine the feed forward control adjustment rate directly from the individual offset angle. In this respect, an implementation as in the case of an open-loop control is present because the offset angle is transmitted directly into the feed forward control adjustment rate. A setpoint/actual value comparison between predetermined individual offset angles and actual or detected offset angles therefore does not take place.

Nevertheless, provision is also made that an individual offset deviation is determined for each rotor blade depending on a comparison of the individual offset angle and a detected, in particular measured, blade angle of the rotor blade. Provision is made here in particular that an individual offset deviation is determined from the comparison of the individual offset angle and the detected blade angle of the rotor blade, adjusted by the collective blade angle. The comparison is in particular a difference between the two variables. The adjustment means in particular that, before the comparison of the detected blade angle, the collective blade angle is subtracted, or the collective blade angle is added to the individual offset angle, or that the collective blade angle is subtracted after the comparison. The offset deviation is intended here to reproduce a deviation between the predetermined offset angle and individual offset angle set at the rotor blade, in order to monitor the implementation. However, the sum of the collective blade angle and individual offset, rather than the offset angle, is connected to the rotor blade, and therefore the adjustment by the collective blade angle takes place again for the comparison.

In this respect, a closed-loop control is also provided which carries out said setpoint/actual value comparison between predetermined individual offset angles and detected blade angles and uses said comparison as explained below.

For the total adjustment rate of each rotor blade, provision is made that this is determined depending on
the collective blade angle and/or the collective adjustment rate,
the individual feed forward control adjustment rate, and
the individual offset deviation.

The total adjustment rate is therefore determined depending on three variables. The intended working point of the wind power installation is taken into consideration via the collective blade angle. The collective blade angle, or instead the collective adjustment rate, or both variables together, can be taken into consideration here. The collective blade angle and the collective adjustment rate are closely associated, and one of these two variables can be used directly, depending on the feedback control concept, and therefore an association with the other variable is also produced in each case therefrom. It is also suitable for the two variables to be directly taken into consideration.

From the individual feed forward control adjustment rate and the individual offset deviation, it is possible to determine an individual adjustment rate which can be connected to the collective adjustment rate in order thereby to form the total adjustment rate for the respective rotor blade. The total adjustment rate of each rotor blade is therefore composed of the collective adjustment rate and the individual adjustment rate. In particular, the sum of the collective adjustment rate and of the individual adjustment rate forms the total adjustment rate.

The individual offset angle enters into the determination of the individual adjustment rate in two ways, namely, firstly, via the individual feed forward control adjustment rate and, secondly, via the individual offset deviation. The individual offset angle is therefore entered both via an open-loop control and via a closed-loop control. The open-loop control can also be referred to as feed forward control and this therefore outputs the individual feed forward control adjustment rate.

By means of such a forward feed control, the individual adjustment rate can take into consideration the individual offset angle rapidly and also without dynamic influences which could otherwise arise through closed-loop feedback control, the individual offset angle thereby immediately and directly influencing the individual adjustment rate.

Nevertheless, deviations can be adjusted by taking into consideration the individual offset deviation. Such deviations are, however, small because of the feed forward control also used, and therefore preferably also a slow feedback controller is suitable which can achieve stationary accuracy or, in the case of a slowly changing offset angle, can at least improve virtually stationary accuracy.

It should also be noted that, in the case of the feedback control which takes the individual offset deviation into consideration, a blade angle or a blade angle deviation, namely the individual offset deviation, is implemented in an adjustment rate.

Each individual offset angle can thus be directly implemented. The implementation is rapid and at the same time achieves a high degree of accuracy.

According to one aspect, it is proposed that the individual feed forward control adjustment rate is determined from the individual offset angle by means of a feed forward control, and a feedback controller adjustment rate is determined from the individual offset deviation by means of an offset feedback controller in order to adjust the individual offset deviation, wherein the total adjustment rate is determined from the collective adjustment rate, from the feed forward control adjustment rate and the feedback controller adjustment rate, in particular from the sum thereof. The individual adjustment rate is determined here from the feed forward control adjustment rate and the feedback controller adjustment rate. The individual offset angle is therefore taken into consideration in two ways.

Firstly, an individual feed forward control adjustment rate is determined from the individual offset angle, namely in particular by derivation of the individual offset angle. This is based here particularly on the finding that the individual offset angle is a function which is variable over time, in particular a cyclic function. A sine function is frequently suitable. Such a time function can be derived according to the time and optionally modified with an amplification factor. The result is the individual feed forward control adjustment rate. This individual feed forward control adjustment rate therefore specifies an intended adjustment speed of the blade angle. If the rotor blade angle is adjusted at said adjustment speed, the individual offset angle arises as the rotor blade angle if the rotor blade angle would otherwise be zero. If, in other words, such an individual feed forward control adjustment rate is therefore connected to a rotor blade angle with the value zero, the individual offset angle ideally arises.

During the running operation, however, the collective blade angle is added to this, and it can be provided as the collective adjustment rate. The collective adjustment rate and the individual feed forward control adjustment rate can be added up, and an adjustment rate, i.e., a change of speed of the blade angle at which the blade angle is adjusted can be produced. In an ideal implementation, the result is that the rotor blade angle corresponds to the sum of the collective blade angle and individual offset angle.

With such a procedure, in particular the use of the feed forward control for determining the individual feed forward control adjustment rate, both the collective blade angle and the individual offset angle are rapidly implemented. Owing to the fact that the feed forward control is an open-loop control, i.e., does not contain any feedback, possible regulating oscillations can be eliminated. The individual offset angle can be predetermined directly and implemented by the individual feed forward control adjustment rate.

Possible deviations, in particular stationary inaccuracies or virtually stationary inaccuracies, cannot, however, be taken into consideration by such a feed forward control. Virtually stationary inaccuracy is understood to this extent as meaning tracking accuracy for a time-variable signal, in particular for a sine signal, which can be predetermined for the individual offset angle.

In order to achieve such a stationary or virtually stationary accuracy, the offset feedback controller which determines a feedback controller adjustment rate from the individual offset deviation is therefore additionally provided. Deviations can thereby be identified and adjusted. However, it should be noted that such an offset feedback controller is provided only in addition to the feed forward control. As a result, the rapid and direct dynamic implementation of the individual offset angle in said individual feed forward control adjustment rate can continue to be ensured, but nevertheless—generally small—deviations can additionally be adjusted. Accordingly, it is also possible for a feedback controller gain of the offset feedback controller to be selected in such a manner that the offset feedback controller plays a minor dynamic role. In particular, oscillations induced by the feedback controller or even instability induced by the feedback controller can be avoided while a rapid implementation of the individual offset angle can nevertheless be achieved.

A P feedback controller is preferably provided as the offset feedback controller. It should be noted that this offset feedback controller also outputs an adjustment rate, i.e., a speed of change of the angle. A constant speed of change leads to a continuous increase of the blade angle. The system therefore has an integral response. This means that the closed-loop control as a whole, i.e., a P feedback controller with a system, also has an integral response. It has therefore been recognized that it is possible to achieve an integral response by an offset feedback controller with a P response if the feedback controller outputs an adjustment rate.

Provision is therefore preferably made for the offset feedback controller to have a P feedback controller or to be designed as a P feedback controller which, by means of a corresponding P factor, converts the angular difference, i.e., the individual offset deviation, into an adjustment rate, namely the feedback controller adjustment rate.

The individual feed forward control adjustment rate and the feedback controller adjustment rate can be added up and can thereby take into consideration or reach the individual offset angle, i.e., the implementation thereof, together.

The individual feed forward control adjustment rate can then be added up together with the feedback controller adjustment rate to form the collective adjustment rate. The offset feedback controller can then be guided as a whole by the sum of the three adjustment rates.

This can be carried out for each rotor blade and, as a result, a rapid, oscillation-free implementation of an individual blade adjustment can be readily achieved, with simultaneously high control precision.

According to one aspect, it is proposed that the feed forward control adjustment rate is determined independently of the detected blade angle, in particular independently of the individual offset deviation. This embodiment emphasizes that no signal feedback from the detected blade angle enters into the determination of the feed forward control adjustment rate. This is precisely what distinguishes an open-loop control or feed forward control. Rapid implementability of the individual offset angle in the feed forward control adjustment rate is therefore achieved and oscillation induced by closed-loop control eliminated.

According to one aspect, it is proposed that the individual offset angle is predetermined as a temporal offset profile, in particular by an offset function which is time-dependent and/or dependent on a position or rotation of the rotor. In particular, a cyclic function during rotation is therefore suitable here, which can be a sine function in particular during uniform rotation of the rotor, i.e., during rotation at a constant rotational speed. However, even when rotation of the rotor is not quite uniform, the adoption of a sine function or the specification of a sine function may be expedient.

Particularly in the case of such a temporal offset profile of the individual offset angle, it is advantageous to provide and to take into consideration the individual feed forward control rate, namely in particular via the aforementioned feed forward control, i.e., without feedback of the resulting blade angle. Dynamic feedback effects due to feedback are avoided and, as a result, problems of design for a corresponding feedback controller, which would carry out such a taking of the individual offset angle into consideration by itself, can thereby also be avoided. It should be particularly noted here that the rotational speed of the rotor can greatly vary depending on the situation. Accordingly, when designing a feedback controller, either a correspondingly robust feedback controller would be required, or an individual adaptation of the feedback controller, in particular of the gain thereof, to the different speeds would be necessary.

The individual offset angle can therefore be predetermined as a temporal offset profile, but it may also be defined as a profile depending on a position of the rotation of the rotor. To this extent, a sine function can be defined as a function depending on the rotor position, i.e., the rotational position of the rotor.

This of course takes place individually for each rotor blade. For example, a 12 o'clock position, in which the rotor blade points vertically upward, can be adopted as a rotational position with a value of 0° or 0n, which then continuously increases, as the rotor rotates, to 360° or $2\pi$, when the rotor has rotated once and the rotor is again in the 12 o'clock position. This rotational position can be used as an input variable for a sine function for the individual offset angle. The extent to which the use of a sine function may be advantageous for further calculations or implementations within the scope of determining the individual feed forward control adjustment rate is also described further below.

According to one aspect, it is proposed that each individual offset angle is predetermined as a temporal offset profile having a pitching component for reducing a pitching moment and a yaw component for reducing a yaw moment.

The effect intended to be achieved by specifying the collective blade angle is an operating setting which is as optimum as possible and which, together with selected rotational speed and generated power, is intended as far as possible to form an optimum operating point. However, the wind speed is frequently not constant over the large rotor area swept over by the rotor blades. In particular, in exemplary and simplified terms, the wind speed is frequently higher in higher regions than in low regions.

This results in cyclic changes in loading during rotation which are intended to be taken into consideration and reduced by the blade adjustment. There should be a differentiation here between two loading directions, namely a loading direction leading to a pitching moment of a nacelle of the wind power installation, and a loading direction leading to a yaw moment of the nacelle of the wind power installation.

The pitching moment refers to a moment, i.e., torque, which points in the pitching direction of the nacelle, i.e., a movement in which the nacelle moves forward and rearward, which leads in the region of the rotor also to a component upward and downward, or the force points in this direction. The yaw moment refers to a moment in a direction about a vertical axis of rotation of the nacelle. An azimuth adjustment can also be undertaken about this axis of rotation and, to this extent, the yaw moment or the associated direction also points in the direction of an azimuth adjustment.

Depending on the position of the rotor blade as it rotates with rotation of the rotor, wind forces on the rotor blade have a differing effect on the pitching moment or the yaw moment. In the case of rotor blades which are substantially perpendicular, a force in the direction of the pitching moment and thus a pitching component are particularly large. If a rotor blade is substantially horizontal, force acts on the rotor blade substantially in the form of a yaw moment.

Therefore, for each rotor blade, there is a loading in the pitching direction and a loading in the yaw direction. Both loadings can be cyclic during rotation as the rotors rotate, but with amplitudes in different rotor positions. In other words, the loading in the pitching direction and the loading in the yaw direction can have a dedicated amplitude and a dedicated phase position. In other words, these two loading functions are displaced with respect to one another and have different amplitudes.

In order to counteract every loading in the pitching direction and every loading in the yaw direction, in each case for one rotor blade, the temporal offset profile of the individual offset angle of the rotor blade concerned has a component which counteracts the pitching moment, and is referred to as pitching component, and a component which counteracts the yaw moment, and is referred to as yaw component. The pitching component and the yaw component, which can therefore be designed or considered to be a partial blade angle profile, can, for their part, also be formed cyclically during rotation of the rotor, with dedicated amplitudes and dedicated phase angles or phase positions. The pitching component and the yaw component are themselves also offset or displaced in terms of phase in relation to each other.

It is now provided here to provide each individual offset angle as a temporal profile which has a pitching component and a yaw component. It is namely provided to combine the pitching component and the yaw component in this one temporal offset profile.

Owing to the fact that both components are combined in the temporal profile of the individual offset angle, only one such temporal profile of the individual offset angle is required. The individual feed forward control adjustment rate of the rotor blade can therefore be determined solely on the basis of this one temporal offset profile. In particular, a corresponding feed forward control requires only one temporal profile of the individual offset angle as an input variable.

According to one aspect, it is proposed that each individual offset angle is predetermined as a temporal offset profile by a time-dependent offset function in order to reduce a pitching moment and a yaw moment. The temporal profile of the time-dependent offset function is characterized here by an amplitude parameter and a phase parameter. The amplitude parameter and the phase parameter take into consideration a reduction both of the pitching moment and of the yaw moment, i.e., simultaneously. In particular, a pitching component and a yaw component are each taken into consideration by the amplitude parameter and the phase parameter.

An individual taking into consideration of the pitching component as a temporal, cyclic profile, in particular as a sinusoidal profile, can be described by a corresponding function through amplitude and phase, namely in particular depending on a rotor position. A corresponding temporal function is thereby also produced by the uniformly or virtually uniformly rotating rotor, i.e., by a constant or virtually constant rotational speed. A function for the yaw component can be provided in the same manner. Both components differ in amplitude and phase, but not in frequency, because they are both dependent on the same revolving rotor position, i.e., on the same rotational speed.

It has been recognized here that two such functions can be combined into a new function with amplitude and phase, this being referred to here as amplitude parameter or as phase parameter. The amplitude parameter therefore takes into consideration the two amplitudes of the individual functions mentioned, and the phase parameter takes into consideration the two phases of the individual functions mentioned. Particularly when two sine functions with the same frequency are adopted, this common function can be determined.

The pitching component and the yaw component can therefore be taken into consideration simultaneously by means of one function.

According to one aspect, it is proposed that at least one amplitude limit value is predetermined for the offset profile, it is checked for each rotor blade whether the offset profile reaches the amplitude limit value, and, if it is reached, a connection of the individual feed forward control adjustment rate to the collective adjustment rate is interrupted, in particular such that a or the feedback controller adjustment rate continues to be connected to the collective adjustment rate. In particular, the feedback controller adjustment rate continues to be connected to the collective adjustment rate, i.e., added up therewith, in order thereby to form the total adjustment rate. The total adjustment rate is therefore then the sum of the collective adjustment rate and feedback controller adjustment rate.

To no longer connect the feed forward control adjustment rate to the collective adjustment rate is therefore provided whenever it is recognized that the offset profile reaches or exceeds the amplitude limit value.

For each individual offset angle, an amplitude limit value is therefore a minimum angle which must not be fallen short of or a maximum angle which must not be exceeded. It is conceivable that in each case a minimum angle and a maximum angle are predetermined, and therefore the offset angle is intended to remain between the minimum angle and the maximum angle, and that this is checked.

It is particularly assumed here that the offset profile is a cyclic, in particular sinusoidal, profile which basically lies below the amplitude limit value but, toward its maximum points, can reach or even exceed a magnitude of the amplitude limit value. It can therefore exceed a maximum angle, or fall below a minimum angle. The assumption is based here particularly on the fact that the offset profile is predetermined continuously depending on detected loadings or other operating conditions. The offset profile can therefore fluctuate in its amplitude.

If such a fluctuation leads to the fact that the offset profile temporarily reaches, or would reach, the amplitude limit value, it is now not proposed to restrict the offset profile to said amplitude limit value, i.e., to cut off said profile in height, but instead only to interrupt the connection of the feed forward control adjustment rate in this case. Only the feed forward control is therefore switched off. The closed-loop control which outputs the feedback controller adjustment rate remains active.

Particularly the described cutting off of a cyclic function can thereby be avoided. It has been particularly recognized here that the proposed feed forward control carries out a derivation of the offset profile. If said offset is cut off, a non-physical bending point therefore arises, which may lead to undesirable effects during the derivation. The problem is avoided by deactivating the feed forward control. Owing to the fact, however, that the feedback controller continues to remain active, the offset angle can nevertheless continue to be taken into consideration although not as well as with the feed forward control.

It has also been recognized here that, although the proposed individual blade adjustment, i.e., the predetermining of the individual adjustment rate, constitutes an improvement and discharge of the wind power installation, and in particular can also extend the total service life, it is acceptable that such an individual blade adjustment is occasionally and temporarily weakened.

According to one aspect, it is proposed that the offset profile is predetermined via the following offset function $f(t)$:

$$f(t)=A*\sin(\omega*t+\phi)$$

wherein
A refers to a predeterminable amplitude,
$\omega$ describes a rotational speed of the rotor, and
$\phi$ describes a predeterminable angular displacement relative to a reference angle.

By means of such an offset function, the offset profile can be characterized by the amplitude A and the angular displacement $\phi$. The amplitude A can also be referred to as an amplitude parameter, and the angular displacement $\phi$ as a phase parameter. Both a pitching component and a yaw component can be taken into consideration simultaneously by said offset function.

Said offset function can likewise be readily and continuously derived. It is already possible at the preliminary stage for the derivative to be determined, at least partially, and therefore a function results depending on the amplitude A and the angular displacement $\phi$. Said derivative or an, in particular proportional, variable corresponding thereto can form the starting point of the feed forward control and/or the individual feed forward control adjustment rate. The individual feed forward control adjustment rate is therefore then already permanently present as a function from which only the parameterization has to be adapted, namely depending on the predeterminable amplitude A and the angular displacement $\phi$, and also on the rotational speed co of the rotor.

A derivation is therefore avoided in the feed forward control during ongoing operation. This simplifies the computing effort and also avoids possible noise amplification which may occur if a noise-affected signal is derived during ongoing operation.

If the amplitude A and/or the angular displacement $\phi$ are/is time-dependent, only they would still have to be derived. If they are constant, no further derivation is required.

According to one aspect, the method is characterized in that the feed forward control adjustment rate is predetermined as a feed forward control profile via the following feed forward control function $v(t)$:

$$v(t)=A*\cos(\omega*t+\phi)*(\omega+d\phi/dt)+dA/dt*\sin(\omega*t+\phi)$$

wherein
A refers to a predeterminable amplitude,
$\omega$ describes a rotational speed of the rotor, and
$\phi$ describes a predeterminable angular displacement relative to a reference angle.

This feed forward control function $v(t)$ is obtained particularly as a derivative of the offset function $f(t)=A*\sin(\omega*t+\phi)$ if the amplitude A and the angular displacement $\phi$ are time-dependent variables or functions. The predeterminable amplitude A and the predeterminable angular displacement $\phi$ therefore correspond to the corresponding values of the aforementioned offset function $f(t)=A*\sin(\omega*t+\phi)$.

It is particularly advantageous in this regard that parts of the feed forward control function $v(t)$, i.e., parts of the derivative, can be predetermined or calculated in advance. During use during operation, it suffices to use the corresponding variables in the feed forward control function $v(t)$ or to carry out the derivation of the predeterminable amplitude A and the predeterminable angular displacement $\phi$. This predeterminable amplitude can also form the previously described amplitude parameter, and the predeterminable angular displacement φ can form the previously described phase parameter, particularly if these are in each case constant values.

The predeterminable amplitude A and/or the predeterminable angular displacement φ can be determined in particular depending on a detection of a loading. Such a detection of a loading can take place directly at the rotor blade concerned, in particular at the blade root thereof or in the vicinity of the blade root, or also determined in some other way, for example by observing a blade deflection. In the determination both of the amplitude A and of the angular displacement φ, there can still be freedom in terms of design, such as filtering, described below, so that both amplitude A and also angular displacement φ do not necessarily have to be obtained unambiguously from the loadings. They can therefore be predetermined at least by selection of their calculation.

According to one aspect, it is proposed that the amplitude A and the angular offset φ of the offset function f(t)=A*sin(ω*t+φ) are determined depending on a detection of a loading. Such a determination depending on the detection of a loading has already been explained above. It is in particular conceivable here that a pitching moment and a yaw moment are detected, or a pitching moment component of the respective rotor blade and a yaw moment component of the respective rotor blade are detected. These can each be characterized by a sinusoidal function having amplitude and a phase angle, i.e., angular displacement, with the frequency being the same. A sine function for both loadings, i.e., for pitching moment and yaw moment, can be derived therefrom, and therefore an amplitude and an angular displacement for both together are obtained for each rotor blade.

In particular, it is proposed that the amplitude A and/or the angular displacement φ form filtered variables. It is particularly taken into consideration here that, during a further calculation for determining the feed forward control adjustment rate, a derivation is carried out which can also comprise a derivation of the amplitude A and the angular displacement φ. Particularly, a higher-frequency interfering variable, in particular noise variable, combined with the amplitude and/or the angular displacement may be unfavorable during the derivation. This problem can be solved, or at least mitigated, by filtering.

In particular, it is proposed that a preliminary amplitude Av and/or a preliminary angular displacement φv are determined depending on the detection of a loading. Basically, the preliminary amplitude Av corresponds to the unfiltered amplitude A, and the preliminary angular displacement φv to the unfiltered angular displacement φ. Accordingly, the amplitude A and/or the angular displacement φ are each determined from the preliminary amplitude Av and/or the preliminary angular displacement φv by filtering of the preliminary amplitude Av and/or the preliminary angular displacement φv. It is also conceivable that a ramp is predetermined as the filter or instead of the filter, as the maximum speed of change for the preliminary amplitude Av and/or for the preliminary angular displacement φw. Excessive increases are therefore avoided and therefore the maximum amplitude of the temporally derived signal is predetermined.

Alternatively, it is proposed to predetermine the amplitude A and the angular displacement φ as constant values depending on the detection of a load, and therefore to be able to predetermine a simplified feed forward control function vs(t) from a derivative of the offset function f(t)=A*sin(ω*t+φ). Thus, namely, the following simplified feed forward control function vs(t) is obtained as follows:

$$vs(t)=A*\cos(\omega*t+\phi)*\omega.$$

Such a simplified feed forward control function vs(t) can be particularly readily determined beforehand and, in online use, avoids the necessity of a continuous derivation of the amplitude A and the angular displacement φ. Instead, only these simplified constant values need to be determined, in particular from the above-described detection of a loading, i.e., in particular from a pitching moment component and a yaw moment component in each case. These values can then be simply input into said simplified feed forward control function vs(t), together with the rotor rotational speed ω. The problems during the derivation of noisy signals are thereby also avoided.

For this purpose, however, it is particularly proposed that these two variables, i.e., the amplitude A and the angular displacement φ, are assumed to be constant only for the purpose of the derivation. It is therefore assumed for simplification that said variables are constant. However, it has been shown that such an assumption is frequently permissible. In particular, it can frequently be assumed that these two variables change only slowly.

It has been particularly recognized here that, although the offset function has a profile changing over time, namely the sinusoidal function, the amplitude A and the angular displacement φ, as characteristic variables of this function, change substantially more slowly. This simplified feed forward control function can therefore be predetermined despite, however, a changing amplitude A and a changing angular displacement φ being taken into consideration.

A wind power installation is also proposed. The wind power installation has a rotor with a plurality of rotor blades, the rotor blades are adjustable in their blade angle, and each rotor blade is activatable individually. In addition, the wind power installation has a control device, and is set up for carrying out an individual blade adjustment. The wind power installation, in particular the control device thereof, is set up here to carry out a method according to one of the above-described aspects. For this purpose, the method can be implemented in the wind power installation, in particular in the control device.

According to one aspect, provision is made that the wind power installation has a detection device, for detecting a loading of a wind power installation. This can be in particular loading measurement devices, such as strain gauges, in each case on the rotor blade in the region of its blade root.

In particular, the detection device is set up for detecting a pitching moment component and a yaw moment component for each rotor blade. The wind power installation, in particular the control device, is set up so as to determine, from the detected pitching moment component and the detected yaw moment component, an offset angle individual to the rotor blade concerned. Furthermore, the wind power installation or the control device thereof is set up to determine an individual feed forward control adjustment rate from the individual offset angle for the rotor blade concerned.

The design in this regard emerges from the description of the corresponding method aspects, as explained further above.

For the wind power installation, but also for the method as a whole, it is also conceivable that the feed forward control adjustment rate is determined directly from detected loadings by virtue of it being possible to dispense with an express outputting of the individual offset angle as an intermediate variable.

The individual offset deviation can be derived from the feed forward control adjustment rate, or an individual offset angle can be determined for the offset deviation, for example, from the detected loadings, but without being used for the feed forward control adjustment rate.

BRIEF DESCRIPTION OF THE SEVERAL VIEWS OF THE DRAWINGS

The invention will be explained in more detail below by way of example using embodiments with reference to the accompanying figures.

DETAILED DESCRIPTION

Figure 1:
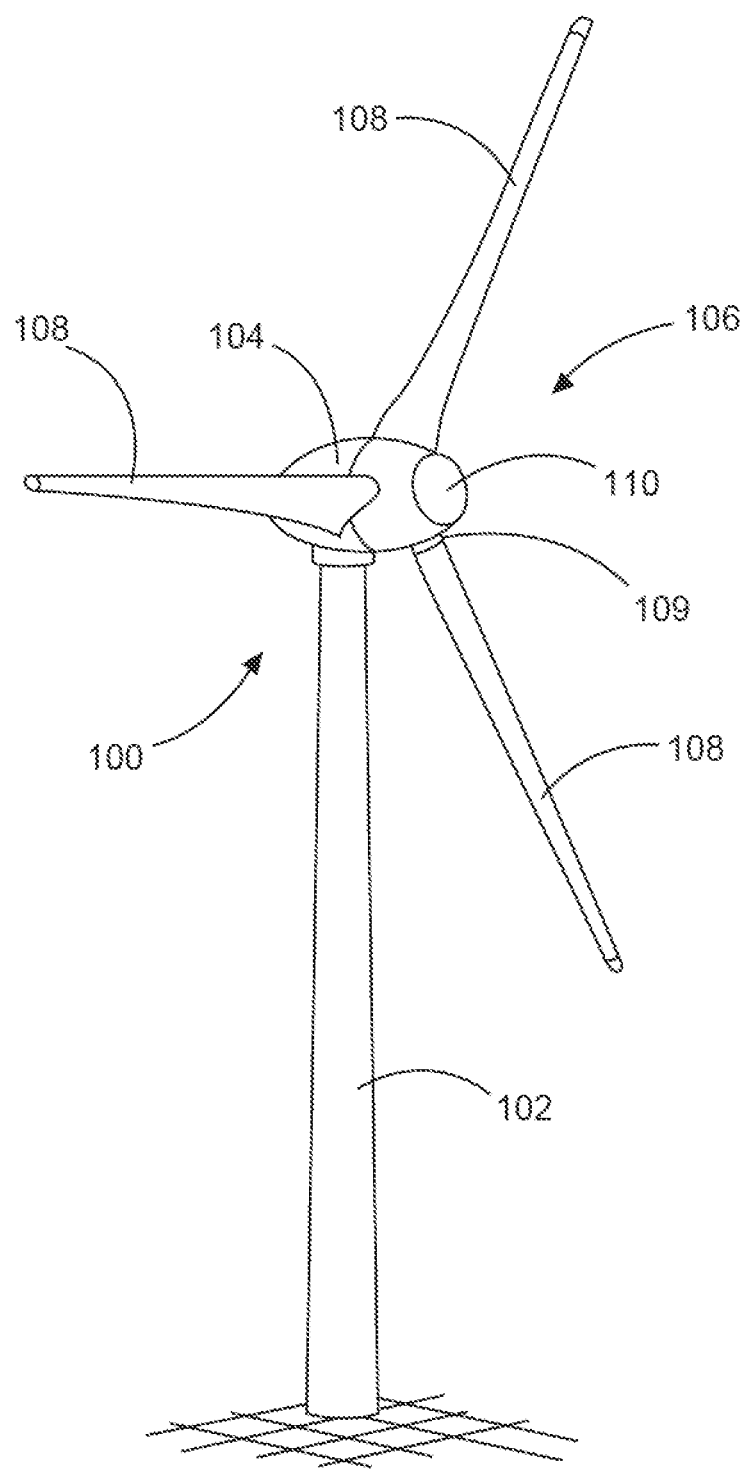
FIG. 1 shows a wind power installation in a perspective illustration.

FIG. 1 shows a schematic illustration of a wind power installation according to the invention. The wind power installation 100 has a tower 102 and a nacelle 104 on the tower 102. An aerodynamic rotor 106 with three rotor blades 108 and a spinner 110 is provided on the nacelle 104. During operation of the wind power installation, the aerodynamic rotor 106 is set into a rotational movement by means of the wind and therefore also rotates an electrodynamic rotor of a generator which is coupled directly or indirectly to the aerodynamic rotor 106. The electrical generator is arranged in the nacelle 104 and generates electrical energy. The pitch angles of the rotor blades 108 can be changed by pitch motors on the rotor blade roots 109 of the respective rotor blades 108.

Figure 2:
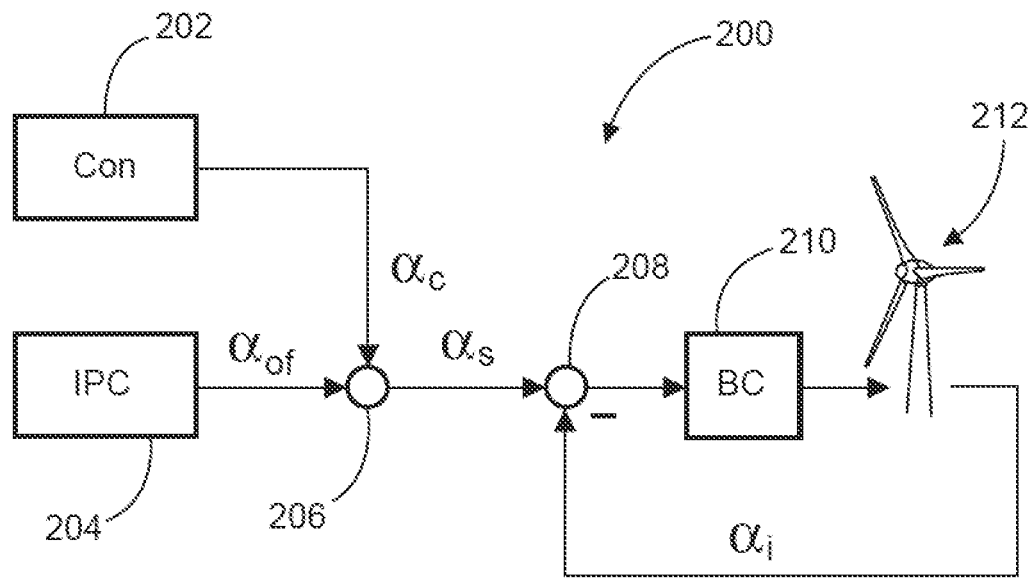
FIG. 2 schematically shows a closed-loop control system of a conventional individual blade adjustment.

FIG. 2 shows a closed-loop control system 200 which relates to a conventional blade angle control with individual blade adjustment. The structure shows an operating control block 202 which predetermines a collective blade angle ac. Said operating control block 202 comprises, for example, a known rotational speed control which outputs the blade angle as correcting variable for controlling the rotational speed. This operating control therefore relates to a blade angle which is identical for all of the rotor blades and which is referred to as the collective blade angle. It can also be synonymously referred to as the common blade angle.

In addition, an individual blade control 204 is provided which provides an offset angle $\alpha_{of}$ for each rotor blade. To this extent, FIG. 2 shows the structure for an individual blade. A wind power installation conventionally has three rotor blades and, accordingly, three such control systems would be required.

The offset angle $\alpha_{of}$ and the collective blade angle ac are added up at the first summing point 206 to form the blade setpoint angle $\alpha_S$. To this extent, three blade setpoint angles are also produced for three rotor blades and correspondingly three structures. Since, however, only the structure for one rotor blade is shown here for illustrative purposes, possible indices for displaying one specific rotor blade are dispensed with. The presented structure is identical to this extent for all of the rotor blades.

The blade setpoint angle $\alpha_S$ is then compared at the second summing point 208 with a detected actual angle $\alpha_i$. The result is a control deviation which is further processed in the blade control in accordance with the blade control block 210 in order to activate the schematically illustrated wind power installation 212 or the corresponding pitch motor there of the rotor blade. As a result, the detected blade angle $\alpha_i$ is obtained which is fed back as described.

An individual blade adjustment can therefore be implemented via such a structure according to FIG. 2, but the control dynamics may be unfavorable because of the stipulation of the absolute blade angle for the collective blade angle. In particular, it has turned out that it is already advantageously possible for the operating control block to predetermine a collective adjustment rate, which is also referred to as collective pitch rate, instead of a collective blade angle.

Figure 3:
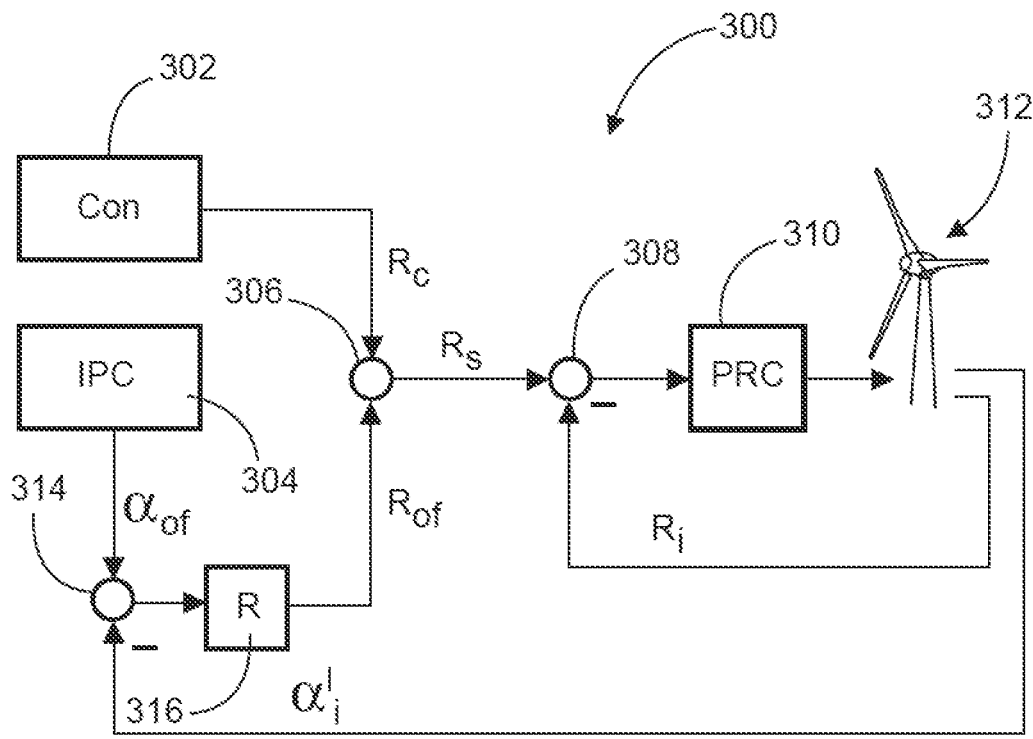
FIG. 3 schematically shows an individual blade control system via an adjustment rate specification.

Such a structure is illustrated in FIG. 3. The closed-loop control system 300 of FIG. 3 therefore likewise has an operating control block 302 which can likewise comprise a rotational speed control and also other operating controls and can in that respect produce a collective blade angle. However, in this structure, the operating control block 302 outputs a collective blade rate $R_C$. An individual blade control 304 is likewise provided which outputs an offset angle $\alpha_{of}$. This is compared at a third summing point 314 with a detected blade angle $\alpha'_i$. The detected blade angle $\alpha'_i$ can therefore be a blade actual angle adjusted by the collective blade angle. However, it is also conceivable that the actual blade angle is fed to the third summing point 314, instead of the offset angle $\alpha_{of}$ being adjusted by the collective blade angle. At any rate, a control deviation is obtained at the third summing point 314 by the differential formation, the control deviation indicating the extent to which the offset angle $\alpha_{of}$ has been successfully connected.

The deviation of the blade angle is then fed to the offset feedback controller 316 which determines an individual adjustment rate $R_{of}$. Said individual adjustment rate $R_{of}$ and the collective adjustment rate $R_C$ are added up in the first summing point 306 and produce the setpoint adjustment rate or setpoint pitch rate for the rotor blade concerned.

In the second summing point 308, a setpoint/actual value is compared with the actual adjustment rate or actual pitch rate $R_i$ which has been detected at the wind power installation 312. This control deviation as an output from the second summing point 308 is then implemented in the adjustment rate control 310 and leads to activation of the wind power installation, in particular of a corresponding pitch drive system.

A problem with this structure in FIG. 3 is that the offset angle is compared with a detected blade angle and the deviation is adjusted with the offset feedback controller 316. Although such an adjustment is desirable, a control response with good stationary accuracy may, however, lead to poor, in particular slow, dynamics. In particular, there can be a proportional or integral response in the offset feedback controller 316 and/or inert dynamics can be provided in order to avoid excessive control excursions during changes of the guide variable. In other words, a feedback controller for stationary accuracy is provided also to adjust minor deviations. It can do this slowly so that it is then inert overall, or rapidly, but this may lead to powerful control activities during guide changes.

Figure 4:
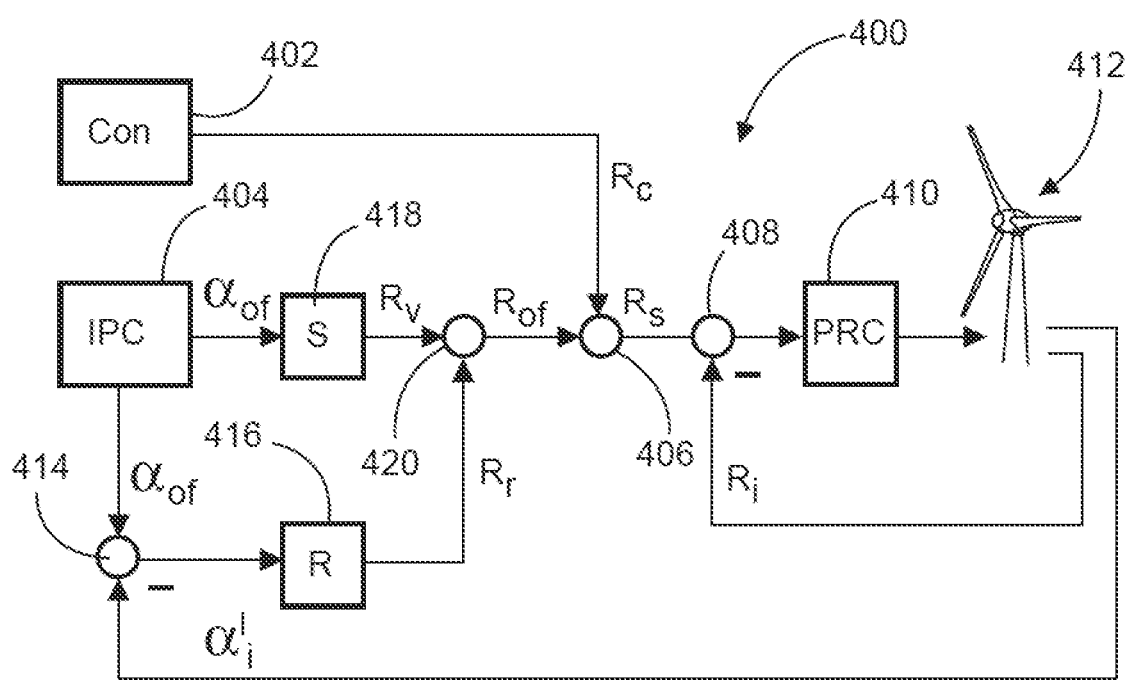
FIG. 4 shows a schematic closed-loop control system of an individual blade adjustment via a pitch rate with feed forward control and an offset feedback controller for controlling the individual blade angle to be connected.

FIG. 4 shows a closed-loop control system 400 which is intended to be an improvement to this extent over the closed-loop control system 300 of FIG. 3. First of all, a collective adjustment rate $R_C$ is also output here in an operating control block 402. The operating control blocks 402 and 302 can be identical.

Similarly, an individual blade control 404 is provided which outputs an offset angle $\alpha_{of}$. To better explain the operation, the closed-loop control system 400 shows that the individual blade control 404 outputs the offset angle $\alpha_{of}$ twice. This serves, however, for illustrative purposes and it can just as readily be provided to output the offset angle $\alpha_{of}$ only at one point or another structural implementation also comes into consideration, in which, for example, the feed forward control adjustment rate is derived directly from loading data.

At any rate, provision is made that the offset angle $\alpha_{of}$ is fed, inter alia, into the feed forward control 418. The feed forward control 418 determines an individual feed forward control adjustment rate $R_v$ from the individual offset angle $\alpha_{of}$. Said feed forward control adjustment rate $R_v$ is provided to already substantially implement the offset angle $\alpha_{of}$ and, for this purpose, is intended to be added to the collective adjustment rate $R_C$ in order thereby to obtain a setpoint adjustment rate overall.

For this purpose, the feed forward control 418 can form a derivative of the offset angle $\alpha_{of}$, optionally provided with a gain factor, in order thereby to directly determine a corresponding adjustment rate. However, it also comes into consideration that implementations equivalent thereto are carried out, for example to undertake a simplified derivation, to undertake filtering beforehand, and/or to calculate part of the derivative beforehand. It also comes into consideration to carry out such a simplification so that the derivative can be completely calculated beforehand and only still to use specific parameters induced by the situation.

By means of such a feed forward control, a corresponding adjustment rate can therefore be implemented rapidly and specifically for the offset angle. A stationary or virtually stationary deviation can neither be recognized nor adjusted.

It is therefore additionally provided to compare the offset angle $\alpha_{of}$ in the third summing point 414 with a detected blade angle $\alpha'_i$. As in the closed-loop control system of FIG. 3, the detected blade angle can be a modified blade angle, namely a measured blade angle modified by a collective blade angle. Here too, a modification by the collective blade angle in the offset angle $\alpha_{of}$ can be carried out instead. In this case, however, such a modification would be carried out only for the offset angle $\alpha_{of}$ which enters the third summing point 414. The value which enters the feed forward control 418 should not be modified.

At any rate, a setpoint/actual value comparison is carried out in the third summing point 414 and a feedback controller adjustment rate $R_r$ is determined depending thereon. This takes place by means of the offset feedback controller 416 which, however, can now be parameterized differently from the offset feedback controller 316 of FIG. 3 since the offset feedback controller 416 of FIG. 4 does not need to carry out a rapid dynamic implementation of the offset angle $\alpha_{of}$ in a feed forward control adjustment rate. The offset feedback controller 416 can be configured in a targeted manner for the pure adjustment or taking a feedback controller deviation into consideration in some other way.

The feed forward control adjustment rate $R_v$ and the feedback controller adjustment rate $R_r$ are added up at the fourth summing point 420 to form the individual adjustment rate $R_{of}$. Said individual adjustment rate $R_{of}$ is therefore the adjustment rate for the offset angle that is produced in total by the feed forward control 418 and the offset feedback controller 416. It is added at the first summing point 406 to the collective adjustment rate $R_C$, thus resulting in the total setpoint adjustment rate $R_S$. This can then be compared, similarly to in FIG. 3, in the second summing point 408 with a detected actual adjustment rate thus resulting in a control error. The latter is implemented in the blade rate control 410, and the blade rate control 410 then activates the wind power installation 412, in particular the corresponding blade adjustment system.

Figure 5:
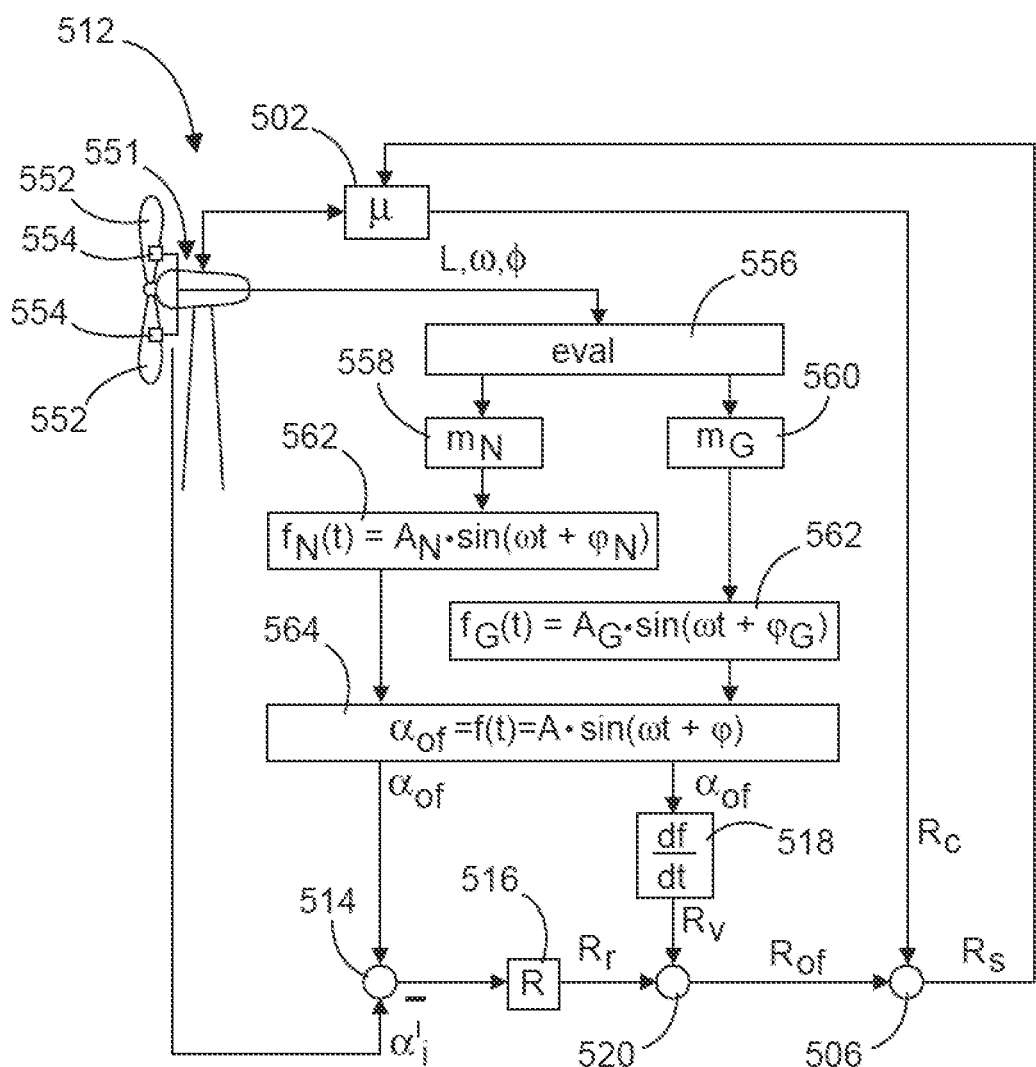
FIG. 5 schematically shows an overall structure of an individual blade adjustment with feed forward control and an offset feedback controller for the offset angle to be connected.

FIG. 5 illustrates an overall view of the underlying method. A wind power installation 512 is indicated for this purpose. Said wind power installation 512 has three rotor blades 552, of which only two can be seen in the schematic illustration. Each of said rotor blade 552 has a plurality of load sensors 554. The latter can each be provided on the rotor blade 552 concerned as strain gauges in the region of a rotor blade root, to mention one example.

It is schematically indicated that corresponding load signals L are fed to an evaluation block 556. Said evaluation block evaluates these measurement values and, for this purpose, can also take into consideration further operating data, such as the rotor rotational speed co and the respective rotor position $\Phi$.

In dependence thereon, the evaluation block 556 can calculate a pitching moment component $m_N$ and a yaw moment component $m_G$. This is indicated by the pitching moment block 558 and the yaw moment block 560. The pitching moment component $m_N$ and the yaw moment component $m_G$ therefore do not form the total pitching moment or yaw moment, but rather only the portion which is to be assigned to the respectively evaluated rotor blade. To this extent, FIG. 5 illustrates merely the evaluation for one rotor blade.

A calculation of an offset function, $f_N(t)$ for the pitching moment and $f_G(t)$ for the yaw moment, then takes place in the pitching moment block 558 and the yaw moment block 560. This offset function indicates how an offset angle profile could be selected depending on the rotational speed co of the rotor 551 in order to compensate for the pitching moment component $m_N$ or yaw moment component $m_G$ as far as possible. This is illustrated by the first and second individual offset blocks 561 and 562. The partial offset functions which are shown in these two blocks are combined in the overall offset block 564 into a common offset function f(t).

This offset function f(t) therefore reproduces a time function for the offset angle $\alpha_{of}$. The overall offset block 564 correspondingly outputs the offset angle $\alpha_{of}$. For illustrative purposes, this also takes place here in the illustration of FIG. 5 in such a manner that two offset angles $\alpha_{of}$ are output, but they may be identical. The overall offset block 564 can therefore correspond to the individual blade control 404 of FIG. 4. The further processing of the offset angle $\alpha_{of}$ therefore also corresponds to that illustrated in FIG. 4.

A feed forward control 518 is therefore provided, in respect of which it is made clear in FIG. 5 that it substantially forms a derivative. It is also true for this feed forward control 518 that it does not necessarily have to be an exact derivative, but that simplifications and/or additional functions, such as filtering or the provision of a gain factor, may also enter into consideration. The result is therefore a feed forward control adjustment rate $R_v$.

In addition, an offset feedback controller 516 is provided which obtains a control deviation as a difference between the offset angle $\alpha_{of}$ and a detected blade angle $\alpha'_i$. It is also pointed out here that the detected blade angle $\alpha'_i$ can be modified by the collective blade angle $\alpha_C$. Alternatively, the offset angle $\alpha_{of}$ entering said third summing point 514 can be modified.

The offset feedback controller 516 therefore outputs a feedback controller adjustment rate $R_r$ and the latter is added at the fourth summing point 520 to form the individual adjustment rate $R_{of}$.

The individual adjustment rate $R_{of}$ is finally added at the first summing point 506 to the collective adjustment rate $R_C$, thus resulting in the setpoint adjustment rate $R_S$, i.e., the total setpoint adjustment rate. Said setpoint adjustment rate $R_S$ is then entered into the operating control block 502 which has previously also produced the collective pitch rate $R_C$. This operating control block 502 therefore carries out a plurality of functions, i.e., more functions than the operating control block 402 of FIG. 4. The second summing point 408 of FIG. 4 can also be realized analogously in the operating control block 502 of the structure of FIG. 5. At any rate, the operating control block 502 interacts with the wind power installation 512, or it is finally also part of the wind power installation 512, and can therefore both intervene in a controlling manner and also receive, evaluate and transmit measurement values.

Therefore, loads are detected, are taken into consideration in respect of pitching and yaw moment, an overall offset function for determining the offset angle is produced depending thereon and, depending thereon, the individual blade adjustment is carried out. The individual blade adjustment is undertaken by stipulating an individual adjustment rate $R_{of}$ which depends on the feed forward control 518 and the offset feedback controller 516. It is then added to the collective pitch rate $R_C$ in order then to obtain a setpoint adjustment rate $R_S$. Said setpoint adjustment rate $R_S$ then takes into consideration both the blade setting for the general system control and the individual load reduction.

Figure 6:
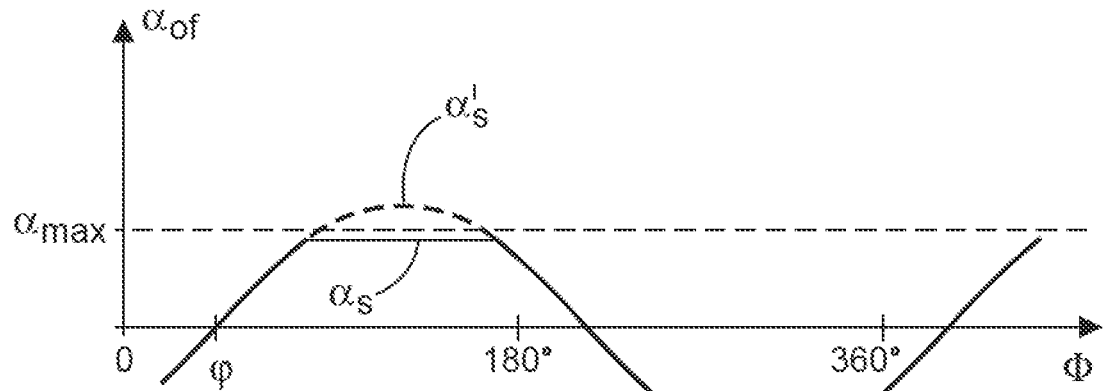
FIG. 6 shows a simplified diagram of a possible offset angle profile of a rotor blade.

FIG. 6 illustrates such an offset function f(t). It is plotted here depending on the rotor angle $\Phi$ and is clearly cyclical through 360°. It can be considered to be a sine function.

It does not pass through the zero point, but rather intersects the abscissa during the angular displacement $\phi$. The angular displacement is relative to a reference angle and can be considered here to be zero.

To this extent, FIG. 6 shows the offset function as a profile of the offset angle $\alpha_{of}$. An amplitude limit value $\alpha_{max}$ can be provided for the offset angle $\alpha_{of}$. For this, a horizontal dashed line is also shown. If the offset function f(t), i.e., the offset angle $\alpha_{of}$, reaches said amplitude limit value $\alpha_{max}$, the offset function f(t) would have to be cut off, which is illustrated by the function partial section as in the diagram. The dashed line profile of the offset function f(t), $\alpha_S'$, may not be implemented.

However, it is proposed not to cut off the offset function, as is illustrated by the section as, but rather to interrupt the feed forward control for the moment. During the interruption, the measurement value detection and evaluation can continue to be carried out, i.e., can proceed normally. Furthermore, control of the offset angle can also be active, but the feed forward control, and therefore the connection of the feed forward control adjustment rate, is temporarily deactivated.

For illustrative purposes in the sequence diagram of FIG. 5, only the feed forward control 518 is therefore deactivated. The entire offset block 564 can continue here to calculate the offset function f(t), despite interruption of the individual blade adjustment, and it can then be determined whether or not the amplitude limit value $\alpha_{max}$ is still reached or would still be reached. The feed forward control 518 can then be correspondingly taken into operation again.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation, wherein:
   the wind power installation has a rotor with a plurality of rotor blades,
   the plurality of rotor blades have adjustable blade angles,
   each rotor blade of the plurality of blade is individually activatable, the method comprising:
   for individual activation of each rotor blade of the plurality of rotor blades, predetermining a total adjustment rate indicative of an intended speed of change of the respective blade angle,
   determining an individual offset angle, which indicates a value by which the blade angle is intended to deviate from a collective blade angle, for each rotor blade,
   determining an individual feed forward control adjustment rate, which indicates an adjustment rate, which is provided for reaching the offset angle, for each rotor blade from the individual offset angle,
   determining an individual offset deviation for each rotor blade depending on a comparison of the individual offset angle and a detected blade angle of the respective rotor blade,
   determining the total adjustment rate of each rotor blade depending on:
   at least one of a collective blade angle identical for all of the rotor blades and a collective adjustment rate identical for all of the rotor blades describing an intended speed of change of the collective blade angles,
   the individual feed forward control adjustment rate, and
   the individual offset deviation, and
   adjusting each rotor blade based on the individual offset angle of the respective rotor blade, the individual feed forward control adjustment rate of the respective rotor blade, the individual offset deviation of the respective rotor blade, and the total adjustment rate of the respective rotor blade.

2. The method as claimed in claim 1, comprising:
   determining the individual feed forward control adjustment rate from the individual offset angle by a feed forward control, and
   determining a feedback controller adjustment rate from the individual offset deviation by an offset feedback controller to adjust the individual offset deviation,
   wherein the total adjustment rate is determined from the collective adjustment rate, the individual feed forward control adjustment rate, and the feedback controller adjustment rate.

3. The method as claimed in claim 2, wherein the total adjustment rate is a sum of the collective adjustment rate, the individual feed forward control adjustment rate, and the feedback controller adjustment rate.

4. The method as claimed in claim 1, wherein the individual feed forward control adjustment rate is determined independently of the detected blade angle and independently of the individual offset deviation.

5. The method as claimed in claim 1, wherein the individual feed forward control adjustment rate is determined independently of the individual offset deviation.

6. The method as claimed in claim 1, wherein the individual offset angle is predetermined as a temporal offset profile by an offset function which is dependent on at least one of time and a position or rotation of the rotor.

7. The method as claimed in claim 1, wherein each individual offset angle is predetermined as a temporal offset profile having:
- a pitching component for reducing a pitching moment, and
- a yaw component for reducing a yaw moment,
  wherein the pitching component and the yaw component are combined in a temporal profile of the individual offset angle.

8. The method as claimed in claim 1, wherein each individual offset angle is predetermined as a temporal offset profile by a time-dependent offset function to reduce a pitching moment and a yaw moment,
  wherein the temporal profile comprises an amplitude parameter and a phase parameter, and
  wherein the amplitude parameter and the phase parameter take into consideration a reduction in the pitching moment and the yaw moment.

9. The method as claimed in claim 1, wherein: at least one amplitude limit value is predetermined for an offset profile, for each rotor blade, checking whether the offset profile reaches the amplitude limit value, and if the offset profile is reached, interrupting a connection of the individual feed forward control adjustment rate to the collective adjustment rate, wherein a feedback controller adjustment rate continues to be connected to the collective adjustment rate.

10. The method as claimed in claim 9, wherein interrupting the connection of the individual feed forward control adjustment rate to the collective adjustment rate comprises interrupting such that the feedback controller adjustment rate continues to be connected to the collective adjustment rate.

11. The method as claimed in claim 1, wherein an offset profile is predetermined via the following offset function f(t):

$$f(t)=A*\sin(\omega*t+\phi)$$

wherein:
  A denotes a predeterminable amplitude,
  $\omega$ describes a rotational speed of the rotor, and
  $\phi$ describes a predeterminable angular displacement relative to a reference angle.

12. The method as claimed in claim 1, wherein the individual feed forward control adjustment rate is predetermined as a feed forward control profile via the following feed forward control function v(t):

$$v(t)=A*\cos(\omega*t+\phi)*(\omega+\phi/dt)+dA/dt*\sin(\omega*t+\phi)$$

wherein:
  A denotes a predeterminable amplitude,
  $\omega$ describes a rotational speed of the rotor, and
  $\phi$ describes a predeterminable angular displacement relative to a reference angle.

13. The method as claimed in claim 1, wherein:
an amplitude A and an angular displacement $\phi$ of an offset function $f(t)=A*\sin(\omega*t+\phi)$ are determined depending on detection of a loading; and
at least one of the amplitude A and the angular displacement $\phi$ form filtered variables, wherein:
  depending on the detected loading, at least one of a preliminary amplitude $A_v$ and a preliminary angular displacement $\phi_v$ are ascertained, wherein:
    the amplitude A is determined by at least one of filtering the preliminary amplitude $A_v$ and predetermining a ramp as the maximum speed of change for the preliminary amplitude $A_v$; and
    the angular displacement $\phi$ is determined by at least one of filtering of the preliminary angular displacement $\phi_v$ and predetermining a ramp as the maximum speed of change for the preliminary angular displacement $\phi_v$,
  or
  depending on the detected loading, the amplitude A and the angular displacement $\phi$ are predetermined as constant values and a simplified feed forward control function vs(t) is predetermined from a derivation of the offset function $f(t)=A*\sin(\omega*t+\phi)$ as:

$$vs(t)=A*\cos(\omega*t+\phi)*\omega.$$

14. A wind power installation comprising:
a rotor with a plurality of rotor blades,
wherein the plurality of rotor blades have adjustable blade angles,
wherein each rotor blade of the plurality of rotor blades is individually activatable, and
a controller configured for carrying out an individual blade adjustment, and
wherein the controller is configured to perform the method as claimed in claim 1.

15. The wind power installation as claimed in claim 14, comprising:
a detection device for detecting a loading of the wind power installation, for detecting a pitching moment component and a yaw moment component for each rotor blade.

16. The wind power installation as claimed in claim 15, wherein the controller is configured to determine, from the detected pitching moment component and the detected yaw moment component, an offset angle individual to the respective rotor blade, and to determine an individual feed forward control adjustment rate for the respective rotor blade.

* * * * *